United States Patent [19]

Negri et al.

[11] Patent Number: 4,832,543
[45] Date of Patent: May 23, 1989

[54] AUTOMATIC HANDLING AND CONTROL DEVICE FOR THE LOADING MAGAZINES OF AUTOMATIC MACHINE TOOLS

[75] Inventors: Roberto Negri, San Lazzaro di Savena; Mario Serra, Bologna, both of Italy

[73] Assignee: C.I.M.A. Costruzioni Italiane Macchine Attrezzi S.p.A., Villanova di Castenaso, Italy

[21] Appl. No.: 83,027

[22] Filed: Aug. 6, 1987

[30] Foreign Application Priority Data

Oct. 7, 1986 [IT] Italy .................................. 3535 A/86

[51] Int. Cl.4 ............................................. B23C 23/04
[52] U.S. Cl. ......................................... 409/7; 82/124; 414/730; 901/35; 409/133
[58] Field of Search ........................... 409/6, 133, 2, 7; 901/35, 46; 414/729, 730; 82/2.5, 2.7

[56] References Cited

U.S. PATENT DOCUMENTS

| | | | |
|---|---|---|---|
| 4,317,394 | 3/1982 | Link et al. ................................ | 82/2.5 |
| 4,600,357 | 7/1986 | Coules ..................................... | 414/730 |
| 4,682,805 | 7/1987 | Reynolds ................................. | 901/46 X |

*Primary Examiner*—Gil Weidenfeld
*Assistant Examiner*—Steven C. Bishop
*Attorney, Agent, or Firm*—Balogh, Osann, Kramer, Dvorak, Genova & Traub

[57] ABSTRACT

The device, which controls operation of the loading magazine in an automatic machine tool and is capable of measuring the handling diameter of single workpieces fed into the machine, comprises a set of jaws located between the magazine and the automatic feed facility, and a transducer which monitors the distance separating the jaws when encompassing the workpiece and relays a corresponding information signal back to the unit which controls the operation of the machine tool as a whole.

12 Claims, 3 Drawing Sheets

AUTOMATIC HANDLING AND CONTROL DEVICE FOR THE LOADING MAGAZINES OF AUTOMATIC MACHINE TOOLS

BACKGROUND OF THE INVENTION

The invention relates to an automatic, self-adjusting device for use in conjunction with loading magazines as fitted to automatic machine tools, in particular automatic gear cutters.

The art field of automatic machine tools, and in particular that of automatic gear cutters, can be said to embrace two methods of magazine loading.

A first system makes use of a turret affording a given number of positions in which the operator places a number of identical workpieces; the turret therefore constitutes a magazine in which the number of positions will depend upon the size of the single workpiece handled. A change in the size of workpiece dictates a corresponding change of turret (or at all events, of the holders carried by the turret).

The second system referred to also makes use of a turret, though in this case, supplied by a number of distinct feeder facilities. Workpieces are split up into types, or families, each identifiable in terms of the diameter effectively handled by the turret; each feeder thus supplies a relative family of workpieces to the turret.

This second type of turret will be provided with at least two holes for each of the families of workpiece handled, one loading and one in reserve, so as to ensure that no break in continuity occurs.

In effect, the turret positions consist in a set of holes which, in order to avoid the need for replacing the turret when no positions are available for a given family of workpieces, take the form of special adapters, each of which suits a given family of workpieces to be handled and machined.

The number of positions afforded by the turret is reduced considerably from a maximum 48, in the first type mentioned, to 6 or 8 in the second.

The different families handled are numerous, and the adapters thus need to be changed frequently, a fact which creates difficulties for the operator inasmuch as space around the turret is limited.

Accordingly, the object of the invention is to provide a device capable of supplying workpieces to a machine tool in genuinely automatic fashion.

SUMMARY OF THE INVENTION

The stated object is achieved with a device as disclosed and claimed herein. Such a device is fully self-adjusting, and features a gripping mechanism located between the feed/discharge facility and the magazine of the automatic machine tool, by which the single workpieces are taken up, and sensing means that are capable of measuring the distance to which the jaws of the gripping mechanism are spread when encompassing a workpiece.

The main advantage of the invention consists in the fact that an automatic machine tool can be fed with workpieces in genuinely automatic fashion, and manual operations can therefore be cut to the bare minimum, assuming that robotics will be employed in operating the feed/discharge system.

A further advantage of the invention, deriving from automatic adjustment to the size of workpiece, consists in the elimination of a considerable number of single operating steps that would otherwise be involved when implementing change operations.

BRIEF DESCRIPTION OF THE DRAWINGS

The invention will now be described in detail, by way of example, with the aid of the accompanying drawings, in which:

FIG. 4 is a diagram of the electrical control circuit for a device as illustrated in FIGS. 1, 2 and 3.

DESCRIPTION OF THE PREFERRED EMBODIMENT

Figure 2:
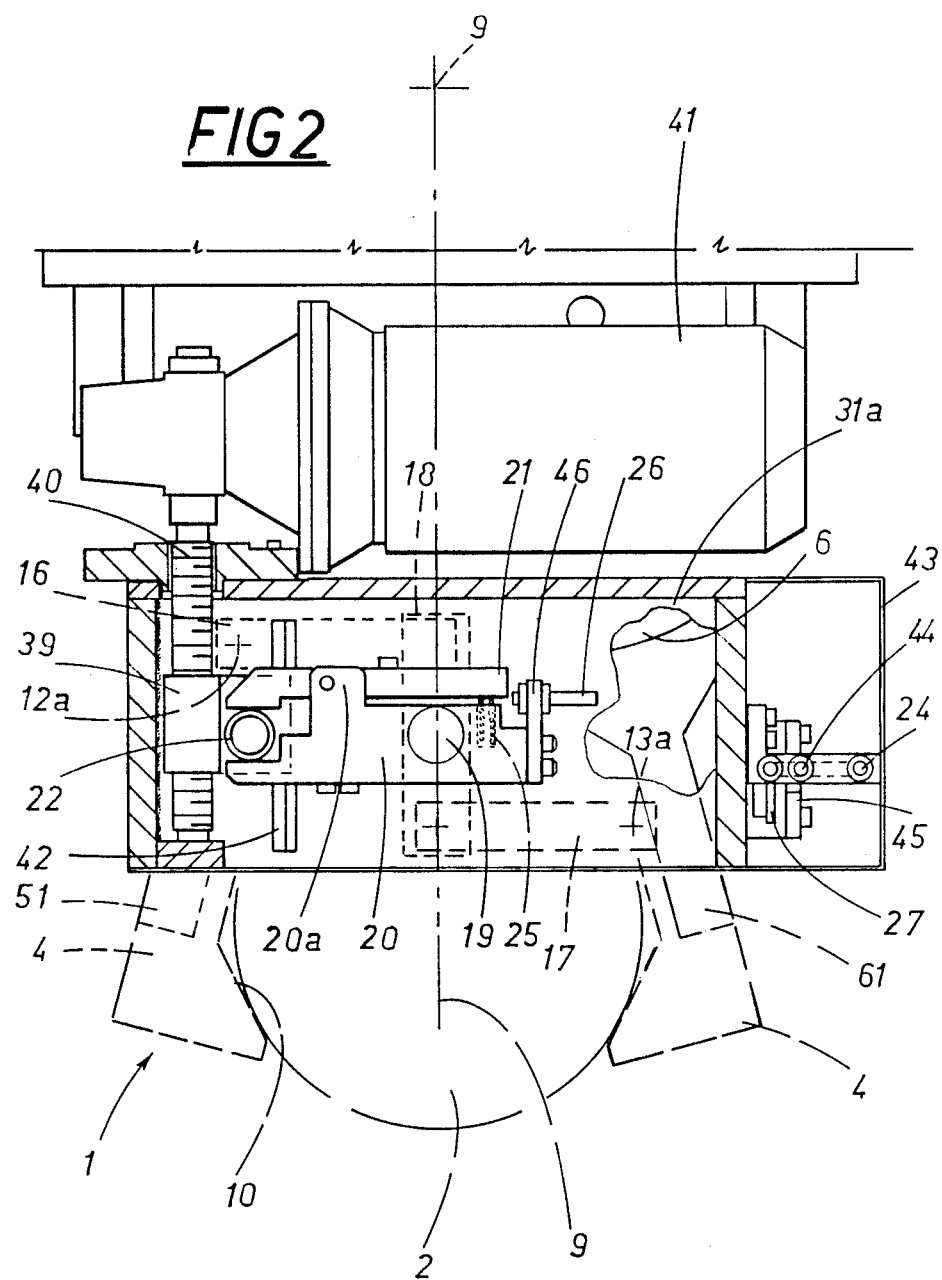
Figure 3:
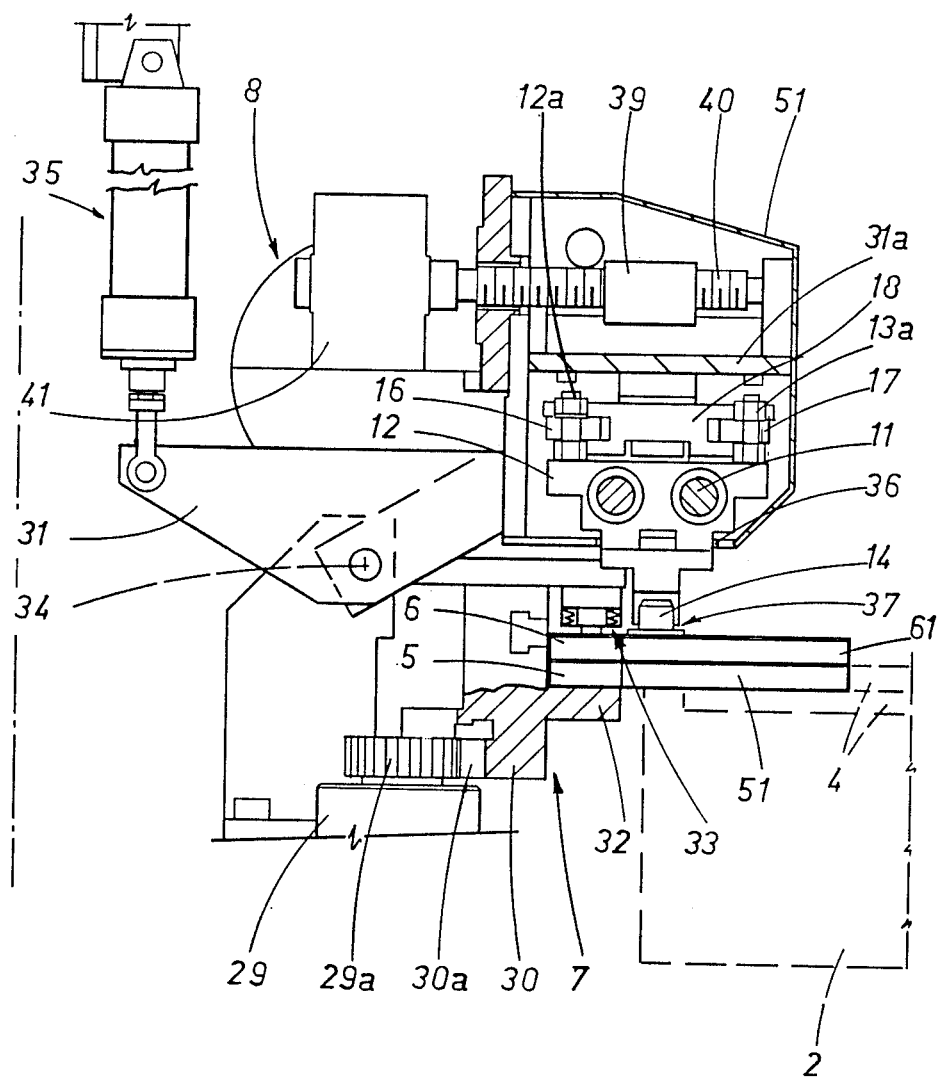

With reference first to FIG. 2 and FIG. 3, the automatic device disclosed consists substantially in a gripping mechanism 1, incorporating pairs of jaws; such a mechanism is carried by a support structure 7 and positioned between the workpiece feed/discharge system serving the automatic machine tool, and the loading magazine. The feed and discharge media and the magazine will be conventional in embodiment, and therefore are not illustrated in the interests of simplicity.

The support structure 7 is split into three tiers denoted 29, 30 and 31 the first of which, the bottom tier 29 (see FIG. 3), is fixed in relation to the automatic machine tool into which the device is integrated. The second, middle tier 30, is annular in embodiment, and fitted to the bottom tier 29 in such a way as to rotate about a vertical axis 9, driven, for example, by a gear 29a associated with the bottom tier 29 which meshes with a internal gear 30a integral with the middle tier 30 (the drive will be conventional, and therefore is not shown). The middle tier rotates only, and does not traverse. The third and uppermost tier 31 is pivoted to the bottom tier 29 in such a way as to rotate about a horizontal axis 34 when shifted, say, by a fluid power cylinder 35. It will be observed from FIG. 3 that the bottom tier 29 of the support structure 7 appears substantially as a column, whereas the uppermost tier 31 is box constructed.

The gripping mechanism 1 consists in a pair of rings 5 and 6 sandwiched together and fitted to the middle tier 30 of the support structure 7, resting on a circumferential flange 32 (FIG. 3). Each ring 5 and 6 exhibits a plurality of projections 51 and 61 distributed around its circumference (one pair of projections can be seen in FIG. 2), to and from which single jaws, denoted 4, can be fitted and removed. The jaws are aligned diametrically with the rings 5 and 6 and arranged in pairs (see FIG. 2, which shows the pair of jaws 4 positioned at one side of the support structure 7, illustrated in phantom lines), and thus provide sets of grippers that are overhung in relation to the rings and disposed symmetrically in relation to the axis 9 about which the annular middle tier 30 of the support structure 7 and the two rings 5 and 6 are caused to rotate. The gripping edges 10 of the paired jaws 4 lie within a common horizontal plane, and are embodied with a dog-leg profile which ensures that the distance between the vertical axis of rotation 9 and the center of each workpiece 2 remains identical, irrespective of the diameter encompassed by the jaws; workpieces 2 are in fact cylindrical in the majority of cases, or at least, the part effectively gripped by the jaws will be cylindrical.

33 denotes a spring-loaded mechanism issuing from the underside of the middle tier 30 of the support structure 7 (see FIG. 3), which impinges on the top surface of the uppermost ring 6 in such a way as to urge both rings 6 and 5 down against the circumferential flange 32.

11 denotes a pair of horizontal guide rails carried by the uppermost tier 31 internally of its box structure and disposed parallel to the axis 34 aforementioned. 12 and 13 denote two slides disposed symmetrically in relation to the axis 9 about which the middle tier 30 rotates, which are designed to traverse along the guide rails 11; each slide 12 and 13 extends downward through a slot 36 in the bottom of the tier 31 and terminates in a clevis 37.

Figure 1:
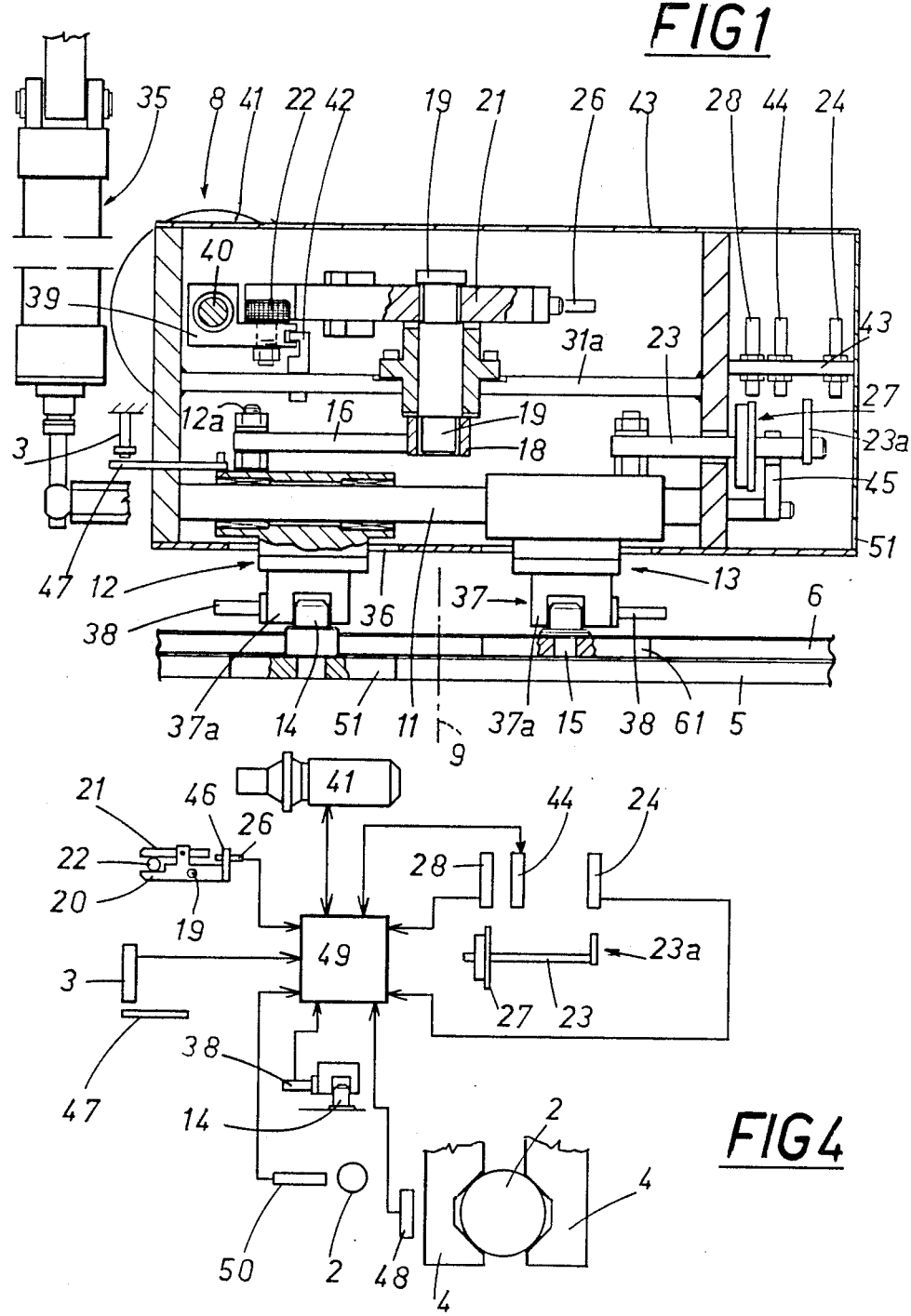
FIGS. 1, 2 and 3 illustrate the automatic handling and control device disclosed, in front elevation, plan and side elevation, respectively, with certain parts removed and others cut away better to reveal others.

The two members 37a of each clevis 37 project at right angles to the horizontal guide rails 11 and accommodate a relative vertical catch pin 14 and 15, which is thus flanked on either side (see FIG. 1); the catch pins 14 and 15 are associated respectively with the two rings 5 and 6, and more exactly, with their circumferential projections 51 and 61, in such a way that the two rings 5 and 6 can be rotated on in relation to the other. 38 denotes a sensor (e.g. a microswitch) that passes through the outermost member 37a of each clevis and serve to verify the engagement of the clevis 37 with its relative pin 14 or 15 (see FIG. 1). The top end of each catch pin 14 and 15 is substantially cylindrical in order that it may slide easily between the clevis members 37a of the relative slide 12 and 13, the movement of which is linear.

12a and 13a denote respective vertical pivots fitted one to the top of each slide 12 and 13 and located at opposite sides of the guide rails 11, to which one end of a relative connecting rod 16 and 17 is hinged; the remaining ends of the two rods are hinged to each end of a center lever 18 (see FIGS. 1 and 3).

The center lever 18 is disposed substantially at right angles to the two connecting rods 16 and 17 and keyed to the bottom end of a vertical shaft 19 that is mounted to a horizontal shelf 31a spanning the uppermost tier 31 of the support structure 7 at mid-height (see FIG. 1). The top end of the shaft 19 is keyed in its turn to an offset control arm 20 which extends horizontally at right angles away from the lever 18.

20a denotes a boss projecting from the control arm 20 at an intermediate point along its length, and at a given distance from the vertical shaft 19; the boss 20a projects transversely, beyond the level of the shaft 19 (see FIG. 2), and supports a rocker lever 21 that is pivoted at an intermediate point along its length and disposed substantially parallel to the control arm 20; accordingly, the arm 20 and the rocker 21 lie on opposite sides of the vertical shaft 19, to all practical intents and purposes. At the end farthest from the shaft 19 and beyond the boss 20a, the arm 20 and the rocker 21 terminate in a pair of jaws locating against either side of a vertical pin 22 which is traversed at right angles to the guide rails 11 by suitable drive means 8; such drive means could be embodied, for example, as a slide 39, with which the vertical pin 22 moves as one, and a lead screw 40 passing through the body of the slide 39 at right angles to the guide rails 11, journalled to the uppermost tier 31 of the support structure 7, and driven in either direction by a geared motor 41 mounted externally of the tier 31. To prevent unwarranted rotation of the slide 39 in relation to the lead screw 40, additional support is provided by a cross rail 42 installed parallel to the lead screw and anchored firmly to the horizontal shelf 31a of the uppermost tier 31.

The arm 20 and the rocker 21 ar biased into contact with the pin 22 by spring means 25 located between the two at a point adjacent to the shaft 19.

It will be seen from FIG. 2 that movement of the pin 22 along the lead screw 40 in either direction causes the control arm 20 and the rocker lever 21 to swing in the same direction; this produces rotation of the center lever, thereby drawing the two slides 12 and 13 closer together or spreading them apart. The ultimate effect of such a maneuver is that the rings 5 and 6 rotate in their respective directions, closing or spreading the jaws 4 accordingly. Thus, movement of the pin 22 in either direction produces a corresponding opening or closing movement of the jaws 4 of the gripping mechanism 1.

The rocker lever 21 is installed in such a way as to engage the side of the vertical pin 22 that pushes to close the jaws of the gripping mechanism, the reason for which will become apparent.

3 denotes first sensing means fitted to the uppermost tier 31 of the support structure 7 (see FIG. 1), serving to measure the movement of a rod 47 that is disposed parallel with the guide rails 11, rigidly attached, say, to the slide denoted 12; such sensing means 3 are wired to a control unit 49 (see FIG. 4) governing operation of the entire automated system.

FIG. 1 illustrates a further rod 23, disposed horizontal and parallel with the guide rails 11, one end of which is attached to the slide denoted 13; the remaining end 23a of the rod projects from the uppermost tier 31 and serves to excite second and seventh sensing means 24 and 44, both mounted to an external horizontal bracket 43, whenever the slide 13 reaches positions corresponding to maximum and minimum spread, respectively, of the jaws 4.

27 denotes a spring-loaded locator fitted to the projecting rod 23 and located externally of the uppermost tier 31, which serves to excite fourth sensing means 28 mounted to the external bracket 43. The seventh sensing means 44 are adjustable for position along the bracket 43 through direction parallel to the guide rails 11. Also associated with the uppermost tier 31 of the support structure 7, likewise externally, is an L-shaped stop 45 designed to prevent the locator 27 from traversing beyond the relative sensing means 28 when the jaws 4 of the gripping mechanism are spread apart.

46 denotes a further rod attached to the end of the control arm 20 farthest from the pin 22, which supports third sensing means 26 serving to detect movement in the adjacent end of the rocker lever 21.

The device disclosed also comprise fifth sensing means 48 (see FIG. 4) which are designed to detect proximity of the gripping mechanism 1, with a workpiece 2 between the jaws 2, when positioned at the loading magazine of the automatic machine tool. The control unit 49 will also comprise a processing facility, the purpose of which is described below.

50 denotes sixth sensing means installed at a given location on the line along which workpieces 2 are fed into the device, which serve to measure the handling diameter of the workpiece ultimately to be encompassed by the jaws 4.

In the interests of greater operator safety, the external bracket 43 and the projecting end 23a of the rod denoted 23 would be enclosed within a removable casing 51.

Operation of the device will now be described, with particular reference to FIG. 4.

Departing from the assumption that the machine tool is in receipt of identical workpieces 2 having a handling diameter that falls within the capability of the jaws 4, and that the jaws of the gripping mechanism are spread apart in readiness to lay hold on the workpiece 2, the sixth sensing means 50 relay a signal to the control unit 49 which reflects the diameter to be encompassed by the jaws 4. Assuming the handling diameter of the incoming workpiece to be the same as that of the workpiece currently being machined, the control unit 49 will proceed, having verified the match, to reset the second, seventh and fourth sensing means 24 44 and 28 and enable the third sensing means 26 With the incoming workpiece and the previously machined workpiece located between their relative pairs of jaws 4, and the state of the microswitches 38 reflecting correct location of each catch pin 14 and 15 in the respective clevis 37, the geared motor 41 starts up and traverses the pin 22 in the direction that draws the jaws 4 together.

This step also shifts the locator 27, which moves as one with the rod 23 until coming up against the wall of the uppermost tier 31, whereupon the rod will continue to slide through the locator 27. Means for detection of proximity of the workpiece 2 fed into the jaws 4 are unnecessary, as the distance between the sixth sensing means 50 and the jaws will be fixed, and covered by the workpieces at a known, constant speed. The geared motor 41 continues to run until the moment when the jaws 4 enter into contact with the workpiece, whereupon the rocker lever 21, which up until this instant will have been moving as one with the control arm 20, begins to register a movement independent of the arm 20, triggering the third sensing means 26; a signal is relayed to the control unit 49, and the geared motor 41 shuts off.

The geared motor is now reversed and restarted, causing the rod denoted 23 to traverse back in the opposite direction (toward the right, in FIG. 1), and shift the locator 27 to the point of exciting the fourth sensing means 28; the result is that the jaws of the gripping mechanism re-open by a fraction. The fluid power cylinder 35 is now actuated in such a way as to raise the uppermost tier 31 of the support structure 7 and free the catch pin 14 and 15 from the relative slides 12 and 13, enabling the gear 29a to rotate the annular middle tier 30, and with it, the gripping mechanism and its pairs of jaws 4.

Rotation of the middle tier 30 will in no way jeopardize the relative positioning of the two rings 5 and 6, hence of the jaws 4 encompassing the two workpieces 2, inasmuch as the rings are both firmly sandwiched between the spring-loaded mechanism 33 and the circumferential flange 32; neither is there any possibility of the workpiece 2 dropping out from between the jaws, as it is supported during rotation by an annular component similar to the flange 32 (which is not illustrated).

On rotation of precisely 180° by the annular middle tier 30, the transferred workpiece 2 will be poised at the machine tool loading magazine and the fifth sensing means 48 will duly excite: the control unit 49 now instructs the cylinder 35 to lower the uppermost tier 31 and cause the clevis 37 of each slide 12 and 13 to engage the catch pin 14 and 15 of the jaw 4 diametrically opposite from the feed-and-discharge side of the device. Enabled by the clevis sensors 38, the control unit 49 now switches in the geared motor 41 to the end of opening the jaws 4, whereupon the fourth sensing means 28 are enabled and the third sensing means 26 reset. The two slides 12 and 13 are distanced one from the other to the point where the end 23a of the rod 23 excites the second sensing means 24, and the configuration of the device returns to that assumed at the outset; the control unit 49 can now instruct removal of the workpieces on the part of the loading magazine and the discharging system, respectively.

Should the sixth sensing means 50 provide the control unit 49, at this juncture, with a signal identical to that relayed previously, the cycle will repeat in exactly the same manner.

In the event, conversely, that the control unit 49 receives a signal from the sixth sensing means 50 different to that relayed before, then the signal is processed accordingly, and the control unit 49 will inhibit the supply of stock to the device until the previous workpiece 2 has been machined, removed by implementation of the steps described above, and discharged, thereby leaving the gripping mechanism completely vacant; two possibilities now exist:

(a) the incoming workpiece 2 is within dimensional handling limits and can be encompassed by the jaws 4 of the gripping mechanism 1;

(b) the incoming workpiece is too large or too small, falling altogether outside the handling limits for which the gripping mechanism has been designed. In the latter instance, the operator is informed of the mismatch by the control unit 49, and once the last item machined has been removed, implementing the steps described above, the jaws will be replaced with another set capable of handling the workpiece next in line.

Returning to the former instance, once the last item machined has been removed and the jaws brought to a standstill following excitation of the fourth sensing means 28 these will be reset by the control unit 49, whereupon the second sensing means 24 will be enabled, and the geared motor 41 is run to spread the gripping mechanism. With the jaws 4 fully spread apart, the end 23a of the rod 23 excites the second sensing means 24 and the geared motor 41 shuts off. The control unit now resets the second sensing means 24 and enables the seventh sensing means 44, and the next workpiece 2 can be fed in, whereupon the geared motor 41 brings the jaws 4 together and the cycle can take up again as per the foregoing description.

In effect, a device according to the invention features a verification procedure which is repeated item by item during operation, namely, comparison of the handling diameter of each incoming workpiece (that is, the diameter effectively encompassed by the gripping mechanism) with that of the workpiece currently being machined.

What is claimed:

1. An automatic handling and control device for unloading workpieces from a feeding device and loading said workpieces on a loading station of automatic machine tools, such as automatic gear cutters, comprising:

a gripping mechanism provided with automatically operated jaws automatically rotatable between, at least, a position at which workpieces are taken up from the feeding device and a position into which workpieces are transferred to said loading station;

first sensing means designed to measure the distance between the jaws of the gripping mechanism when encompassing a workpiece to be transferred to said loading station, and to relay a corresponding signal to control unit means provided in said automatic machine tools, wherein the gripping mechanism is realized by a pair of coaxially disposed rings, breasted together horizontally and carrying at least one diametrically-aligned jaw apiece, said rings being fitted to a support structure and being counter-rotatable one way and the other about a vertical axis in such a way that the jaws can be drawn together and spaced apart, respectively, and operated by drive means associated with said first sensing means.

2. A device as in claim 1, wherein each ring of the gripping mechanism carries two interchangeable single jaws, disposed substantially in diametrical alignment, in such a way as to create two pairs of jaws that are arranged symmetrically in relation to the vertical axis about which the rings rotate, and draw together or spread apart simultaneously when operated by the drive means.

3. A device as in claim 1, wherein the gripping edges of the jaws exhibit a dog-leg profile which ensures that the distance between the vertical axis of rotation and the center of each workpiece remains identical, irrespective of the handling diameter of the workpiece encompassed by the jaws.

4. A device as in claim 1, wherein said drive means comprise a pair of slides traversed along at least one horizontal guide rail carried by the support structure, which slides associate mechanically at their bottoms with the two rings of the gripping mechanism by way of respective catch pins, and are linked above by way of relative connecting rods to a center lever pivoting between two limit positions that correspond to the maximum and minimum spread configurations of the gripping mechanism.

5. A device as in claim 4, wherein one of the two slides is associated with the first sensing means.

6. A device as in claim 4, wherein of the two rings exhibits at least two projections to which the jaws are attached and by which the relative batch pins are carried.

7. A device as in claim 4, wherein the drive means further comprises:
a vertical shaft mounted to the support structure, keyed to the center lever on one end an to a control arm on the other;
a rocker lever, offset transversely from the axis of the vertical shaft and pivotably mounted to the control arm at a given intermediate point along its length;
a vertical pin engaged on one side by the rocker lever and the other side by the control arm, which is designed to traverse horizontally between two limit positions that correspond to the maximum and minimum spread configurations of the gripping mechanism, and arranged so that its leading side pushes against the rocker lever when the jaws of the gripping mechanism are drawn together;
spring means located between the control arm and the rocker lever, serving to bias the rocker lever into contact with the vertical pin;
third sensing means associated with the control arm, serving to halt the traverse of the vertical pin upon detection of movement of the rocker lever in relation to the control arm.

8. A device as in claim 4, wherein said drive means further comprises:
a horizontal rod, carried by one of the slides, a end of which is designed to excite second sensing means when the gripping mechanism reaches maximum spread configuration, to the end of halting the movement of the center lever;
a spring-loaded locator fitted to the horizontal rod, serving to excite fourth sensing means which, when enabled by a signal from fifth sensing means that detect the arrivals of a workpiece being transferred into the loading station, instruct a fractional movement of the center lever in the direction that spreads the jaws of the gripping mechanism.

9. A device as in claim 4, wherein the support structure comprises at least three tiers:
A first tier, at bottom, which is fixed in relation to the automatic machine tool;
a second tier, annular in embodiment, which is fitted to the first tier in such a way as to rotate about the same vertical axis as that of the rings of the gripping mechanism and incorporates a circumferential flange affording support to the rings;
a third tier, uppermost, pivotably associated with the second tier, and capable of rotating about a horizontal axis parallel to the horizontal guide rails of the drive means in order to free the slides of the drive means from the respective catch pins.

10. A device as in claim 9, wherein the second annular tier of the support structure comprises a spring-loaded mechanism designed to urge the rings of the gripping mechanism firmly into permanent contact with the circumferential flange, irrespective of whether the slides are engaged by the catch pins, or not engaged.

11. A device as in claim 5, wherein the first sensing means are embodied as a linear transducer.

12. A device as in claim 3, wherein the jaws of the gripping mechanism are designed to encompass diameters falling within a given dimensional range, and wherein sixth sensing means are employed, connected to said control unit and able to verify whether or not the handling diameter of each incoming workpiece can effectively be encompassed by the jaws.

* * * * *